United States Patent [19]

Shepley

[11] Patent Number: 5,285,600
[45] Date of Patent: Feb. 15, 1994

[54] APPARATUS AND METHOD FOR FINISHING A WORKPIECE

[75] Inventor: Barry E. Shepley, Novi, Mich.

[73] Assignee: Ford Motor Company, Dearborn, Mich.

[21] Appl. No.: 992,348

[22] Filed: Dec. 17, 1992

[51] Int. Cl.$^5$ ............................................. B24B 7/00
[52] U.S. Cl. ...................................... 51/323; 51/5 C; 144/38; 408/27
[58] Field of Search ............... 51/5 C, 3, 281 SF, 323; 144/38, 219; 408/27

[56] References Cited

U.S. PATENT DOCUMENTS

| | | | |
|---|---|---|---|
| 1,284,092 | 11/1918 | Gray | 144/38 |
| 2,454,992 | 11/1948 | Coleman | 51/5 C |
| 4,675,975 | 6/1987 | Kucharczyk et al. | 29/566 |
| 4,852,304 | 8/1989 | Honda et al. | 51/5 |
| 4,894,956 | 1/1990 | Honda et al. | 51/5 |

*Primary Examiner*—Jack Lavinder
*Attorney, Agent, or Firm*—Roger L. May; Joseph W. Malleck

[57] ABSTRACT

Apparatus (10) and a method for finishing a workpiece (12) are performed by a first spindle (24) that rotatably mounts a milling cutter (28) about a central axis A and a second spindle (32) also mounted on the support for rotation about the central axis A to mount a grinding wheel. The first spindle (24) has an annular shape that extends around the second (32), and the apparatus includes a drive (38) capable of rotating the first spindle (24) at a slower rate than the rotation of the second spindle (32) such that milling and grinding operations can be performed at effective speeds. An axial slide (40) mounts the first spindle (24) for rotation and for axial movement along the central axis with the second spindle (32) on which the grinding wheel (36) is mounted located within the annular support.

8 Claims, 2 Drawing Sheets

APPARATUS AND METHOD FOR FINISHING A WORKPIECE

TECHNICAL FIELD

This invention relates to apparatus and a method for finishing a workpiece by milling and grinding.

BACKGROUND ART

Finishing of a workpiece by an initial milling operation and a subsequent grinding operation has previously been performed by separate milling and grinding machines such that two operations are involved as well as additional workpiece handling between the two processes.

The prior art discloses cutting and abrasive operations performed at the same speed as each other. For example, U.S. Pat. No. 4,675,975 Kucharczyk et al discloses a combination planing and finishing tool wherein outer cutting inserts are mounted about an inner abrasive finishing disc on the same body such that the cutting inserts and the abrasive finishing disc rotate at the same rate as each other. Likewise, U.S. Pat. No. 4,852,304 Honda et al and U.S. Pat. No. 4,894,956 Honda et al disclose apparatus and a method for slicing a semiconductor ingot into thin wafer pieces by a slicing blade that is mounted on a rotary body that also supports a grinding wheel utilized to provide smooth finishing, such that both the slicing blade and the grinding wheel rotate at the same speed.

DISCLOSURE OF INVENTION

One object of the present invention is to provide improved apparatus for finishing a workpiece by both milling and grinding operations.

In carrying out the above object, apparatus constructed in accordance with the present invention includes a support including an axial slide. A spring positioner of the support biases the axial slide in one direction along a central axis and the support also includes a hydraulic positioner for selectively moving the axial slide in the other direction along the central axis against the bias of the spring positioner. A first spindle of an annular shape is mounted on the axial slide of the support for rotation about a central axis and for axial movement with the slide along the central axis, and the first spindle has an end for supporting a milling cutter. A second spindle of the apparatus is also mounted on the support for rotation about the central axis within the annular shape of the first spindle and has an end for mounting a grinding wheel. A drive of the apparatus is capable of rotating both the first and second spindles with the rotation of the first spindle being at a slower rate than the rotation of the second spindle such that milling and grinding operations can be performed at effective speeds. In other words, the milling can be performed at a slower speed which is more effective for milling and the grinding can be performed at a faster speed which is more effective for grinding.

Most preferably, the spring positioner biases the axial slide along the central axis in a direction away from the end of the first spindle that supports the milling cutter, and the hydraulic positioner selectively moves the axial slide against the bias of the spring positioner in the other direction along the central axis toward the end of the first spindle that supports the milling cutter.

In the preferred construction, the drive includes first and second electric motors that respectively drive the first and second spindles. Furthermore, the first electric motor preferably has an output that rotates about a motor axis spaced from the central axis and also has a continuous drive loop by which the output thereof drives the first spindle. Furthermore, the second electric motor preferably has a rotor output that rotates about the central axis on the second spindle to provide the driving of the grinding wheel.

Another object of the present invention is to provide an improved method for finishing a workpiece.

In carrying out the immediately preceding object, the improved method for finishing a workpiece is performed by rotating an annular milling cutter about a central axis to perform a milling operation on the workpiece and by also rotating a grinding wheel about the same central axis as the milling cutter within the confines thereof but at a faster speed of rotation to perform a grinding operation on the workpiece. Such rotation of both the milling cutter and the grinding wheel about the same axis but with the milling cutter rotated at a slower speed of rotation than the faster speed of rotation of the grinding wheel performs effective milling and grinding operations.

In one preferred practice of the method for finishing a workpiece, the milling and grinding operations are performed at the same time as each other. Another preferred practice of the method for finishing a workpiece is conducted by initially performing the milling operation and thereafter performing the grinding operation.

The objects, features and advantages of the present invention are readily apparent from the following detailed description of the best mode for carrying out the invention when taken in connection with the accompanying drawings.

BEST MODE FOR CARRYING OUT THE INVENTION

Figure 1:
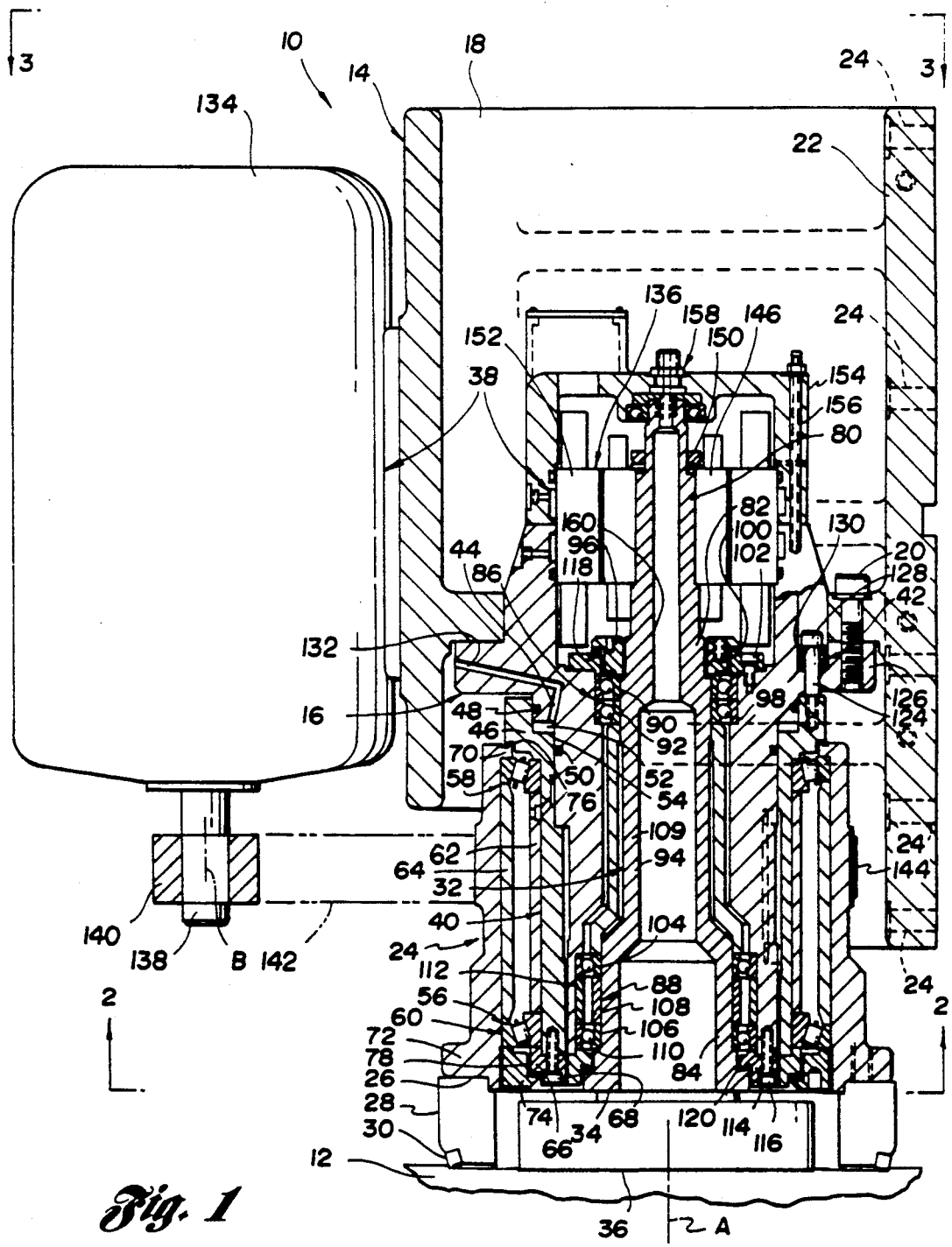
FIG. 1 is an elevational view taken in section through apparatus constructed in accordance with the present invention.

With reference to FIG. 1 of the drawings, apparatus generally indicated by 10 is constructed in accordance with the present invention to provide finishing of a workpiece 12 which is performed in accordance with the method of the invention by the apparatus. Both the apparatus and the method will be described concurrently with each other.

Apparatus 10 as shown in FIG. 1 includes a support assembly 14 having a support 16 and a mount 18 on which the support assembly is mounted and secured by a plurality of circumferentially spaced bolts 20. The mount 18 has a mounting wall 22 including openings 24 though which bolts provide mounting thereof on an unshown machine base. A first spindle 24 is mounted on the support 16 for rotation about a central axis A and has an end 26 for supporting a milling cutter 28 whose cutting inserts or teeth 30 provide a milling operation on the workpiece 12 during such rotation. A second spindle 32 of the apparatus is also mounted on the support 16 for rotation about the central axis A and has an end 34 for supporting a grinding wheel 36 which most preferably is of the ring type for grinding the workpiece 12. One of the spindles, which as is hereinafter more fully described is the first spindle 24 that supports the milling cutter 28, extends around the other spindle which is the second spindle 32 that supports the grinding wheel 36. A drive 38 of the apparatus is capable of rotating both the first and second spindles 24,32 with the rotation of the first spindle 24 that supports the milling cutter 28 being at a slower speed than the rotation of the second spindle 32 that supports the grinding wheel 36 such that milling and grinding operations can be performed at effective speeds.

The operation of the apparatus which is capable of driving the milling cutter at a slower speed such as on the order of about 5,000 feet per minute while at the same time driving the grinding wheel at a much faster speed of about 30,000 feet per minute has particular utility in finishing aluminum and cast iron to provide superior flatness and the micro finish necessary for effective sealing that is necessary with certain gasket materials.

As mentioned above, the first spindle 24 that supports the milling cutter 28 is the one that extends around the other spindle which is the second spindle 32 that supports the grinding wheel 36. This construction thus encloses the grinding wheel 36 which is rotated faster within the confines of the milling cutter 28 which has an annular shape. Furthermore, this construction allows both the milling and grinding operations to be performed at the same time since the milling cutter 28 does not cut as deeply as the grinding wheel 36 and the smaller grinding wheel thus always grinds the workpiece where the milling has already been performed.

As shown in FIG. 1, the support 16 includes an axial slide 40 that mounts one of the spindles, which is the first spindle 24 that supports the milling cutter 28, for axial movement along the central axis A. The first spindle 24 that supports the milling cutter 28 is thus the spindle mounted by the axial slide 40.

Support 16 of the apparatus as shown in FIG. 1 includes a spring positioner 42 for biasing the axial slide 40 in one direction along the central axis A and also includes a hydraulic positioner 44 for selectively moving the axial slide 40 against the bias of the spring positioner 42 in the other direction along the central axis A.

Figures 2, 3:
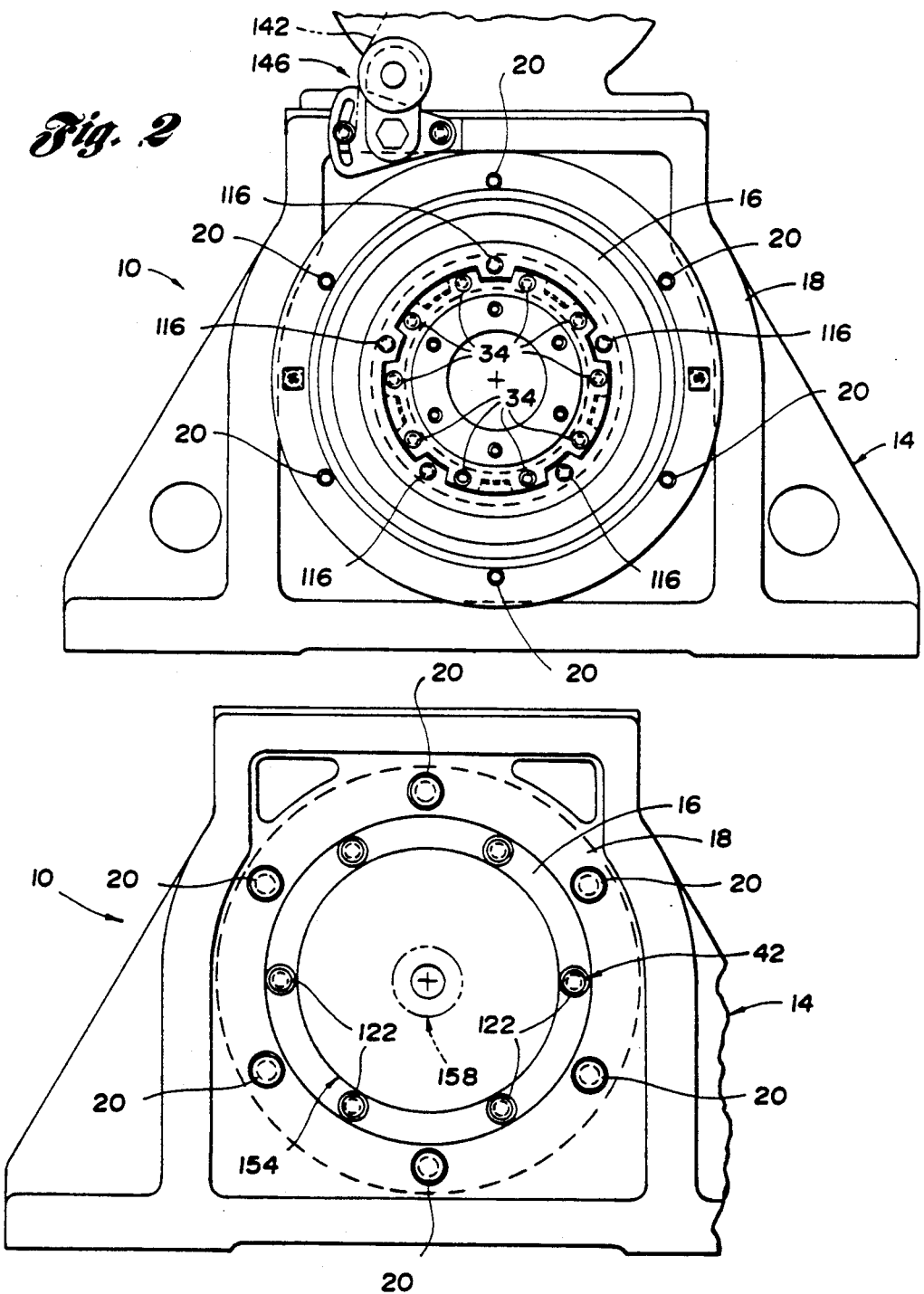
FIG. 2 is a bottom plan view of the apparatus taken along the direction of line 2—2 in FIG. 1.
FIG. 3 is a top plan view of the apparatus taken along the direction of line 3—3 in FIG. 1.

With combined reference to FIGS. 1, 2 and 3, the apparatus has the support 16 provided with an annular construction about the axis A. Both the first spindle 24 and the axial slide 40 also have annular constructions extending about the annular support 16. More specifically, the axial slide 40 has an upper end 46 of an annular flange shape which is sealed by upper and lower O-ring seals 48 and 50 to cooperate with the support 16 in defining a hydraulic chamber 52 to which the hydraulic positioner 44 provides pressurized hydraulic fluid. This pressurized hydraulic fluid acts on the adjacent upwardly facing annular surface 54 on the axial slide 40 at the lower side of the hydraulic chamber 52 so as to thereby operate against the spring positioner 52 in moving the slide 40 downwardly.

An anti-friction bearing assembly 56 is shown in FIG. 1 as being mounted about the slide 40 and includes upper and lower tapered anti-friction bearings 58 and 60 as well as inner and outer annular spacers 62 and 64. As shown on the left side of axis A, the lower end of slide 40 includes a bearing retainer 66 that is secured by circumferentially spaced bolts 68 (only one shown) to the slide and engages the inner race of the lower bearing 60 so as to force the inner spacer 62 upwardly against the inner race of the upper bearing 58 which is thus captured against an adjacent surface of the slide 40 just below the hydraulic chamber 52 previously described. The first spindle 24 that supports the milling cutter 28 has an upper end 70 that engages the outer race of the upper bearing 58 and also has a lower end 72 that threadingly receives a nut 74 which engages the outer race of the lower bearing 60 to thus force the outer races of the upper and lower bearings 58 and 60 against the upper and lower ends of the outer annular spacer 64. The tapered construction of the upper and lower bearings 58 and 60 as shown with the axes of the bearing elements of the upper bearing 58 extending outwardly in a downward direction and with the axes of the bearing elements of the lower bearing 60 extending outwardly in an upward direction thus provides a sandwiching effect that allows the first spindle 24 to be mounted for the rotation on support 16 about the central axis A. Furthermore, the upper end 70 of the first spindle 24 defines an annular labyrinth seal 76 with the adjacent flanged upper end 46 of slide 40 while the nut 74 threaded onto the lower end 72 of the first spindle 24 defines an annular labyrinth seal 78 with the bearing retainer 66 on the lower end of axial slide 40. Pressurized air is supplied through suitable unshown passages for flow out through these labyrinth seals to cool the apparatus and also prevent entry of contaminants.

The second spindle 32 has an upper end 80 that is driven by the drive 38 as is hereinafter more fully described and also has an intermediate portion 82 and a lower end 84 that are respectively mounted for rotation within the annular confines of support 16 by an intermediate anti-friction bearing assembly 86 and a lower anti-friction bearing assembly 88. Bearing assembly 86 includes a pair of ball bearings 90 and 92 whose inner races are captured between the upper end of a spacer 94 that extends about the second spindle 32 and a nut 96 that is threaded onto the intermediate spindle portion 82. The outer races of the bearings 90 and 92 are captured between an annular spindle surface 98 and an annular bearing retainer 100 that is secured by circumferentially spaced bolts 102 (only one shown) to the support 16.

With continuing reference to FIG. 1, the bearing assembly 88 that supports the lower end 84 of the second spindle 32 includes upper and lower ball bearings 104 and 106 whose inner races are separated by an annular spacer 108 that extends around the lower end of the second spindle. An annular spacer 109 extends around the second spindle 32 and has an upper end that engages the inner race of the bearing 92 of intermediate bearing assembly 86, and the spacer 109 has a lower end that engages the inner race of the upper ball bearing 104 of the lower bearing assembly 88. The inner race of the lower ball bearing 106 of bearing assembly 88 engages an annular flange on the lower end 84 of the second spindle 32. As such, the nut 96 that secures the intermediate bearing assembly 86 also forces the lower bearing assembly 88 against the annular flange 110 on the second spindle lower end 84. Outer races of the bearings 104 and 106 of lower bearing assembly 88 are spaced by an annular spacer 112 on the support 16 and are compressed by a bearing retainer 114 that is secured by circumferentially spaced bolts 116 only one of which is shown on the right side of axis A.

Labyrinth seals are formed at both the intermediate bearing assembly 86 and the lower bearing assembly 88. More specifically, the intermediate bearing assembly 86 has an annular labyrinth seal 118 formed between the nut 96 and the bearing retainer 100, while the lower bearing assembly 88 has an annular labyrinth seal 120 formed between its lower end 84 and the bearing retainer 114. Pressurized air fed through suitable unshown passages for flow through these labyrinth seals cools the apparatus and prevents the entry of contaminants like the other labyrinth seals previously described.

As shown in FIG. 3, the spring positioner 42 includes a plurality of spring positioner units 122 that provide the axial biasing of the axial slide 40. More specifically, each positioner unit 122 as shown in FIG. 1 includes a bolt 124 whose shank is threaded into the upper end 46 of the axial slide 40 and extends through an annular flange 126 of support 16 in an upward direction. A head 128 of the bolt 124 engages the upper side of a stack of annular springs 130 with the lower end of the spring stack engaged with the flange 126 so as to thus normally bias the axial slide 40 upwardly.

Hydraulic positioner 44 includes a hydraulic passage 132 through which hydraulic fluid is fed into the chamber 52 to provide pressurized fluid that biases the axial slide 40 against the bias of the spring positioner 42 as provided by the positioner units 122 described above.

As illustrated in FIG. 1, the drive 38 includes first and second electric motors 134 and 136 that respectively drive the first and second spindles 24 and 32. This use of dual motors allows the first spindle 24 that supports the milling cutter 28 to be driven at a slower speed than the speed at which the second motor 136 drives the second spindle 32 on which the grinding wheel 36 is mounted.

The first motor 134 of the drive 38 is shown in FIG. 1 as having an output 138 that rotates about a motor axis D and supports a sprocket 140 that drives a continuous belt 142 that is also received by a sprocket 144 on the first spindle 24. The first motor 144 as illustrated in FIG. 2 has an adjuster 146 that provides proper tensioning of the belt 142.

The second electric motor 136 has a rotor output 148 that is mounted by a retainer nut 150 on the upper end 80 of the second spindle 32 to provide driving of the grinding wheel 36. A stator 152 of the second motor 136 is located within a motor housing 154 which is secured to support 16 by a plurality of circumferentially spaced bolts 156. A coolant inlet 158 of the sealed rotary type is mounted by motor housing 154 to feed coolant downwardly through a central passage 160 of the second spindle 32 for providing a cutting fluid to both the milling and grinding operations.

The method for finishing a workpiece utilizing the apparatus 10 is performed by rotating the milling cutter 28 about the central axis A to perform a milling operation on the workpiece 12 and by also rotating the grinding wheel 36 about the same central axis A as the annular milling cutter within the confines thereof but at a faster speed of rotation to perform a grinding operation on the workpiece. In one preferred practice of the method, the milling and grinding operations are performed at the same time as each other during one pass of the workpiece. When this is performed, it should be noted that there must be sufficient overlapping of the next cut so that the entirety of the workpiece is more smoothly finished by the grinding wheel 36 which has a smaller diameter than the milling cutter 28 that performs the rough cutting. In another practice of the method, the milling operation is initially performed with the milling cutter moved on the axial slide 40 by the hydraulic positioner against the bias of the spring positioner 42 to perform the milling. Thereafter, the milling cutter is moved on the axial slide 40 by the hydraulic positioner 44 to expose the grinding wheel to perform the grinding operation. The axial slide 40 is also useful in adjusting the difference in cutting depths of the milling and grinding operations when these operations are performed at the same time as described above.

In performing the milling and grinding operations, it is possible to rotate the milling cutter 28 and grinding wheel 36 in the same or in opposite directions as each other. However, it is preferable for the milling cutter 28 and grinding wheel 36 to be rotated in opposite directions as each other since the torque of each is then offset by the other.

While the best mode for carrying out the invention has been described in detail, those familiar with the art to which this invention relates will recognize various alternative designs and embodiments for practicing the invention as defined by the following claims.

I claim:

1. Apparatus for finishing a workpiece, comprising:
   a support including an axial slide, the support including a spring positioner for biasing the axial slide in one direction along a central axis and the support also including a hydraulic positioner for selectively moving the axial slide in the other direction along the central axis against the bias of the spring positioner;
   a first spindle of an annular shape mounted on the axial slide of the support for rotation about the central axis and for axial movement with the slide along the central axis, and the first spindle having an end for supporting a milling cutter;
   a second spindle also mounted on the support for rotation about he central axis within the annular shape of the first spindle and having an end for mounting a grinding wheel; and
   a drive capable of rotating both the first and second spindles with the rotation of the first spindle being at a slower rate than the rotation of the second spindle such that milling and grinding operations can be performed at effective speeds.

2. Apparatus as in claim 1 wherein the spring positioner biases the axial slide along the central axis in a direction away from the end of the first spindle that supports the milling cutter, and the hydraulic positioner selectively moving the axial slide against the bias of the spring positioner in the other direction along the central axis toward the end of the first spindle that supports the milling cutter.

3. Apparatus as in claim 1 wherein the drive includes first and second electric motors that respectively drive the first and second spindles.

4. Apparatus as in claim 3 wherein the first electric motor has an output that rotates about a motor axis spaced from the central axis and also has a continuous drive loop by which the output thereof drives the first spindle, and the second electric motor having a rotor output that rotates about the central axis on the second spindle to provide the driving of the grinding wheel.

5. Apparatus for finishing a workpiece, comprising:
   an annular support having a central axis;
   an annular slide extending around the support and being mounted thereon for axial movement along the central axis;

a first spindle of an annular shape and anti-friction bearings for mounting the first spindle on the annular slide for rotation about the central axis, and the first spindle having an end for supporting a milling cutter;

the support including a spring positioner that biases the axial slide along the central axis in a direction away from the end of the first spindle that supports the milling cutter, and the support also including a hydraulic positioner for selectively moving the axial slide against the bias of the spring positioner in the other direction along the central axis toward the end of the first spindle that supports the milling cutter;

a second spindle and anti-friction bearings for mounting the second spindle within the annular support for rotation about the central axis, and the second spindle having an end for mounting a grinding wheel;

a drive including first and second electric motors for respectively rotating the first and second spindles with the rotation of the first spindle being at a slower rate than the rotation of the second spindle such that milling and grinding operations can be performed at effective speeds.

6. A method for finishing a workpiece comprising:

rotating an annular milling cutter about a central axis to perform a milling operation on the workpiece; and rotating a grinding wheel about the same central axis as the annular milling cutter within the confines thereof but at a faster speed of rotation to perform a grinding operation on the workpiece.

7. A method for finishing a workpiece as in claim 6 wherein the milling and grinding operations are performed at the same time as each other.

8. A method for finishing a workpiece as in claim wherein the milling operation is initially performed and the grinding operation is thereafter performed.

* * * * *